United States Patent
Kolar

Patent Number: 6,112,462
Date of Patent: Sep. 5, 2000

[54] SINGLE-DRUM DUAL-CABLE WINDOW REGULATOR

[75] Inventor: Jeffrey W. Kolar, Livonia, Mich.

[73] Assignee: Hi-Lex Corporation, Battle Creek, Mich.

[21] Appl. No.: 09/122,605

[22] Filed: Jul. 27, 1998

[51] Int. Cl.⁷ .................................................. E05C 7/06
[52] U.S. Cl. .............................. 49/121; 49/352; 49/360; 74/500.5; 74/89.22
[58] Field of Search .............................. 49/121, 360, 380, 49/352, 347, 413, 324, 116; 254/264; 74/500.5, 89.22

[56] References Cited

U.S. PATENT DOCUMENTS

| | | |
|---|---|---|
| 4,920,698 | 5/1990 | Friese et al. . |
| 4,995,195 | 2/1991 | Olberding et al. . |
| 5,146,712 | 9/1992 | Hlavaty . |
| 5,400,721 | 3/1995 | Greene ..................................... 108/147 |
| 5,531,046 | 7/1996 | Kollar et al. . |
| 5,613,323 | 3/1997 | Buening . |
| 5,655,727 | 8/1997 | Hanson et al. ........................... 242/388 |
| 5,724,769 | 3/1998 | Cripe et al. . |
| 5,784,833 | 7/1998 | Sponable et al. . |
| 5,822,922 | 10/1998 | Grumm et al. ........................... 49/380 |
| 5,836,110 | 11/1998 | Buening ..................................... 49/360 |

*Primary Examiner*—Daniel P. Stodola
*Assistant Examiner*—Curtis A. Cohen
*Attorney, Agent, or Firm*—Young & Basile, P.C.

[57] ABSTRACT

A window regulator for driving two sliding window panes, such as of a truck rear window, in opposing directions has a housing containing two linear actuator, one driving each of the sliding panes. The first actuator has opposite ends engaged with a drive drum and a midpoint engaged with the first sliding pane, and the second linear actuator has opposite ends engaged with the drive drum and a midpoint engaged with the second sliding panes. The drive drum has two parallel, spiral grooves, one receiving each of the linear actuators. The first and second linear actuators pass around pulleys and guide blocks attached to the housing and follow separate paths within the housing such that rotation of the drive drum in one direction pulls on respective first ends of the first and second linear actuators to draw the sliding panes toward one another, and rotation of the drum in the opposite direction pulls on respective second ends of the linear actuators to draw the panes away from one another. The regulator housing is adapted to be attached to the fixed panes of the window assembly outboard of the sliding panes or to some other stationary structure of the vehicle surrounding the window opening.

9 Claims, 3 Drawing Sheets

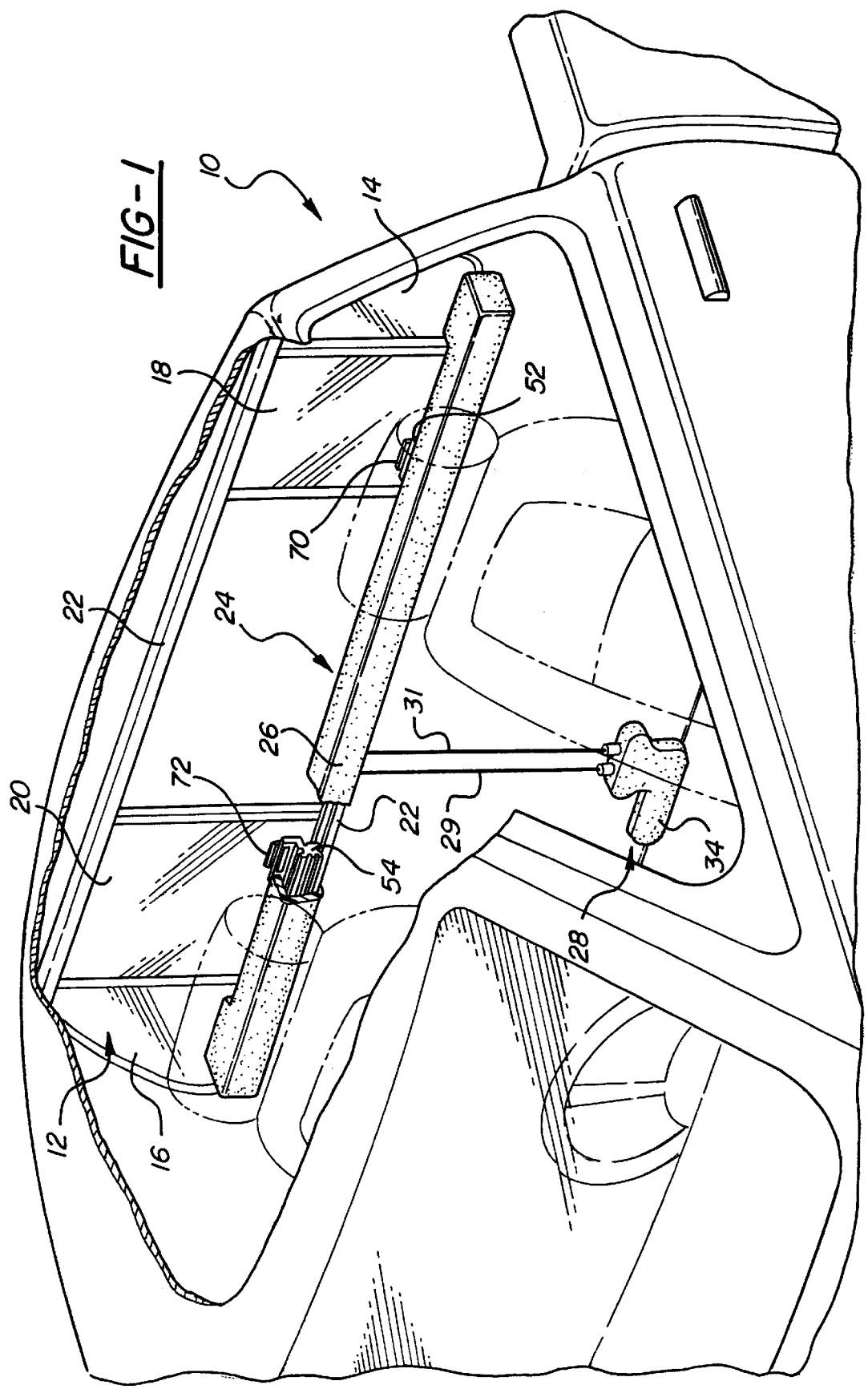

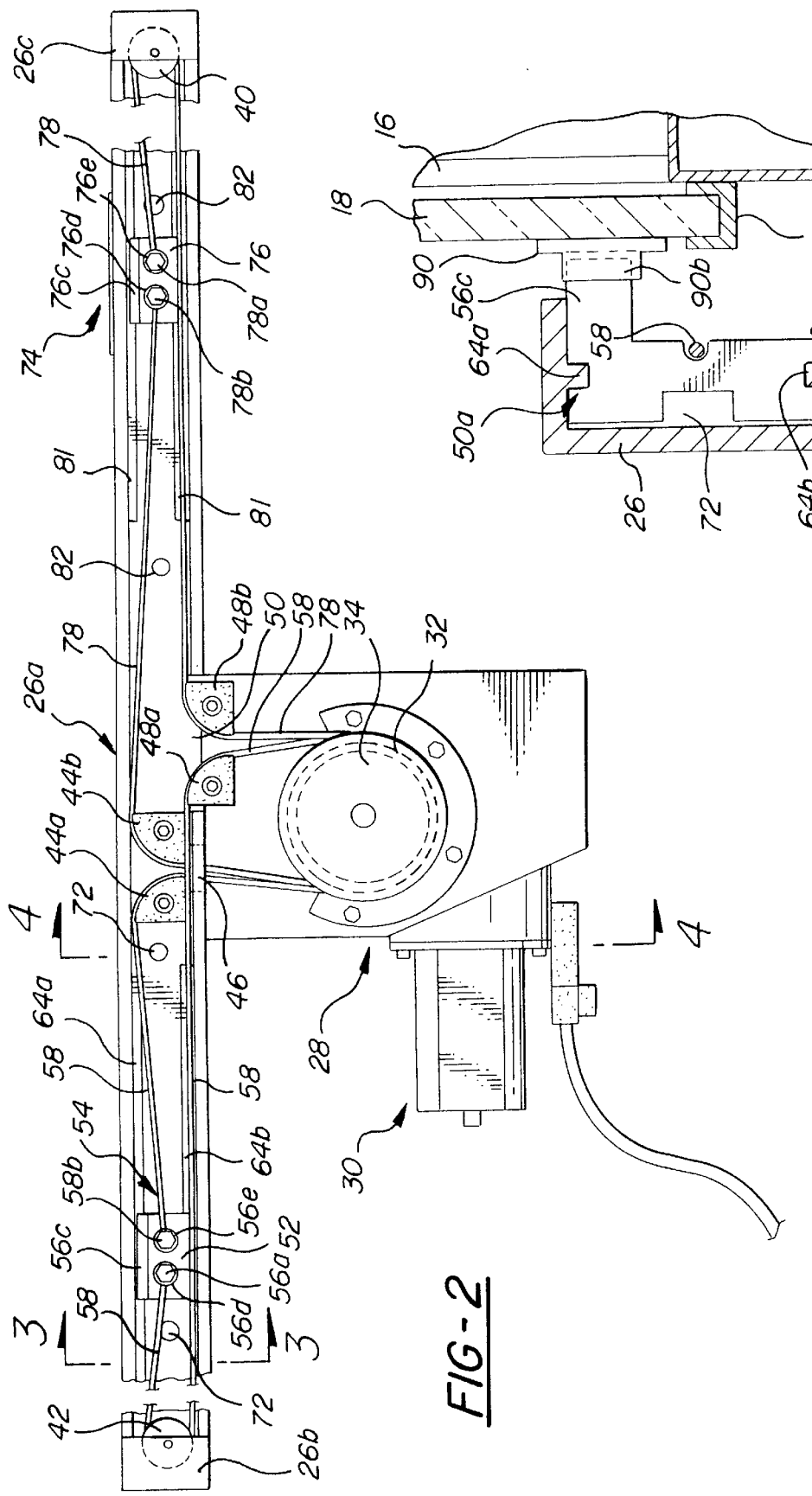

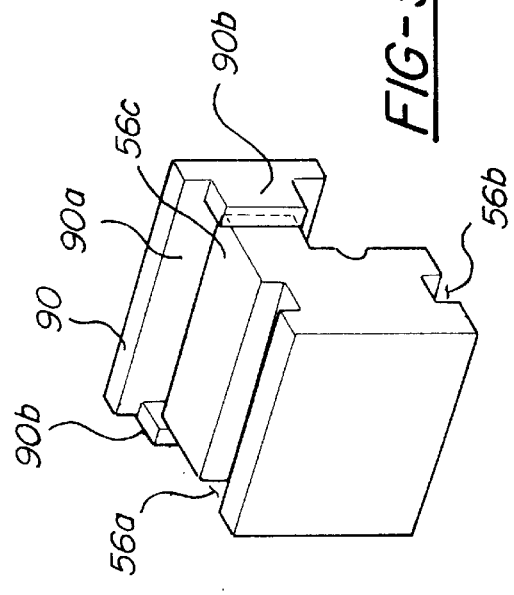
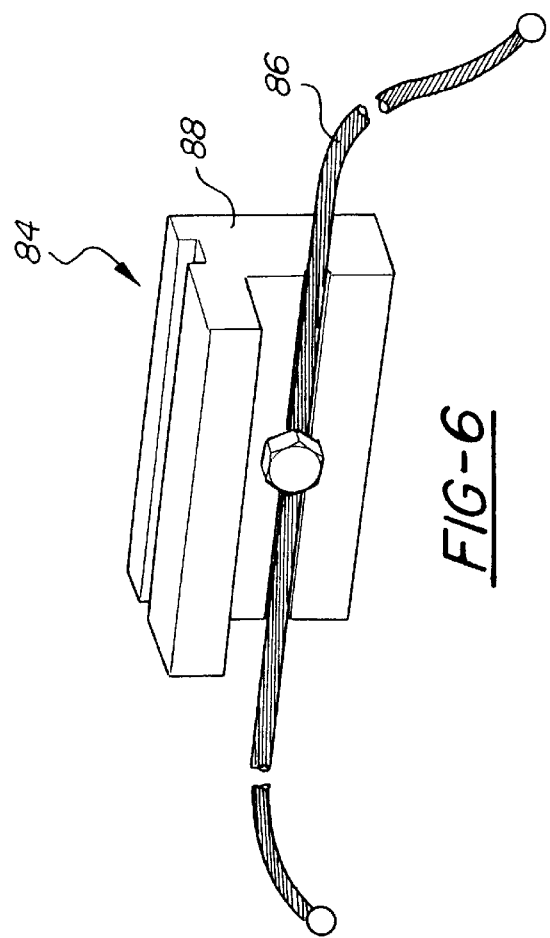
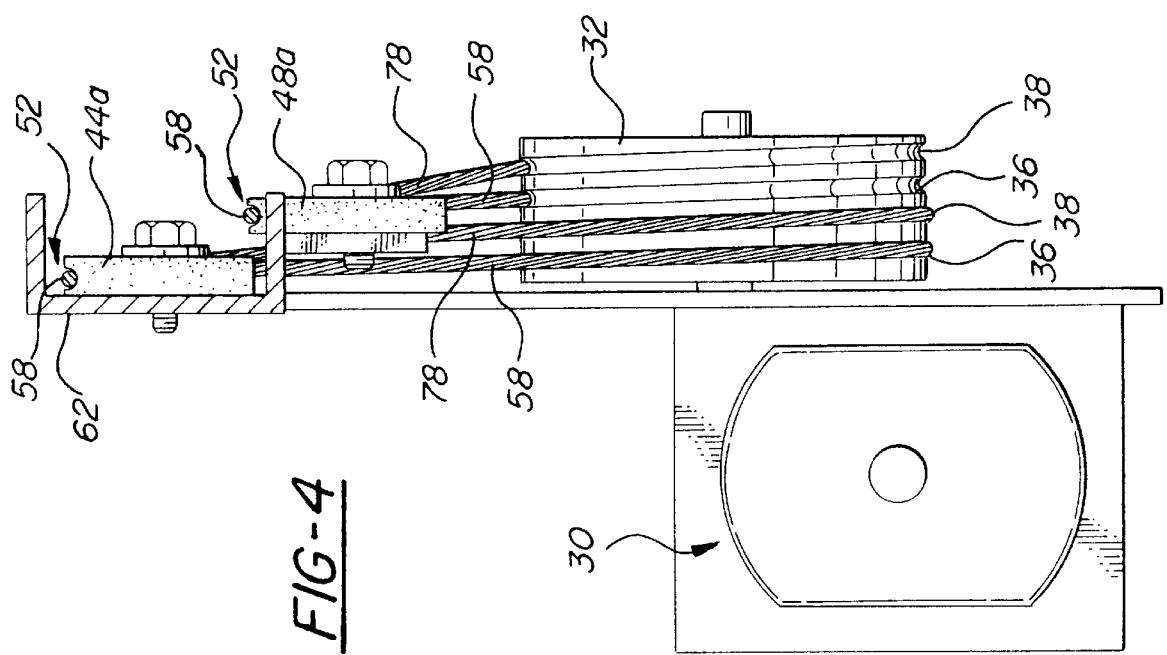

SINGLE-DRUM DUAL-CABLE WINDOW REGULATOR

FIELD OF THE INVENTION

This invention relates to sliding window assemblies for motor vehicles and more specifically to a powered window regulator for opening and closing sliding window panes.

BACKGROUND OF THE INVENTION

It is known to fit the rear window opening of a truck cab with a sliding window assembly made up of a pair of stationary window panes mounted outboard in a window opening to define an gap therebetween, and one or two window panes retained along their upper and lower edges in guide tracks for horizontally sliding movement. In an assembly having two sliding panes, the panes slide toward one another to close the gap between the stationary panes and slide in opposite directions away from one another to an open position in which they overlap the stationary panes.

Many different power window regulator mechanisms have been proposed to allow an occupant of the truck to open and close the sliding window by actuating a switch. These prior art regulator mechanisms usually employ a reversible electric motor to drive a cable, slotted tape, or a rack-and-pinion mechanism to move the slidable panes between the open and closed positions. The regulator mechanisms of the prior art are typically integrated in some fashion with the window frame which surrounds the window assembly and/or with the guide tracks in which the sliding panes are retained. As a result, the window panes, frame and the guide rails must be specially designed to incorporate the regulator system. Consequently, a window assembly designed to be compatible with a powered regulator is substantially different from an unpowered, manually operated sliding window. This lack of commonality between the powered and manual systems complicates the manufacturing and supply situation for a truck manufacturer wishing to offer both options on a particular type of vehicle.

Regulators utilizing a cable drive system have been proposed for window assemblies featuring a single sliding pane. See, for example, U.S. patent application Ser. No. 08/696,657 and U.S. Pat. No. 4,920,698. For systems having two sliding panes, however, more complicated drive mechanisms have been found to be necessary, such as threaded shafts (U.S. Pat. No. 4,995,195) or a combination of a rack-and-pinion and slotted tape mechanism (U.S. Pat. No. 5,146,712).

The prior art power sliding window regulators have also generally required a relatively high degree of dimensional accuracy in the interface between the window assembly and the regulator. This is a consequence of the drive components of the regulator mechanism being integrated with the window frame and/or guide rails for the sliding panes. A relatively new type of automotive vehicle window assembly, known as a "frameless" assembly, has been proposed. In this frameless window assembly, the fixed window panes are installed directly into the window opening to provide a more simple and clean appearance. Since there is no rigid frame surrounding the window panes, the dimensional accuracy and "flatness" of such an assembly depends upon the construction of the vehicle structure surrounding the window opening. Because of normal manufacturing tolerances, the surrounding structure is bound to be less dimensionally precise than that of a traditional, separately fabricated window frame.

SUMMARY OF THE INVENTION

It is an objective of this invention to provide a vehicle window regulator wherein the simplicity and ease of manufacture of a cable drive system is adapted for use with a window assembly featuring two movable window panes which slide in opposite directions.

It is the further objective of this invention to provide a power-driven window regulator assembly fabricated as a self-contained and separate unit which may be attached to a window assembly that is nearly identical to a window assembly intended for manual operation. This allows a single window assembly to be utilized for both manual and power applications and simplifies the construction of the window assembly.

It is yet another objective of this invention to provide a sliding window regulator that is relatively insensitive to a low degree of dimensional precision in the window assembly to which it is attached and the structure surrounding the window assembly.

These objectives are achieved in the present invention by a window regulator wherein a first linear actuator has opposite ends engaged with a drive drum and a midpoint engaged with a first sliding pane, and a second linear actuator has opposite ends engaged with the drive drum and a midpoint engaged with a second sliding panes. The first and second linear actuator assemblies extend along separate paths such that rotation of the drive drum in one direction pulls on respective first ends of the first and second linear actuator assemblies to draw the sliding panes toward one another, and rotation of the drum in the opposite direction pulls on respective second ends of the linear actuators to draw the panes away from one another. This configuration wherein a separate, closed-loop linear actuator assembly drives each of the slidable panes results in a simple, compact and efficient vehicle window regulator.

According to a further feature of the invention, the linear actuator assemblies are routed along the interior of an elongated regulator housing, with cable guides mounted within an elongated regulator housing along which the first and second linear actuators are routed. A drive assembly comprising an electric motor and a cable drum is attached to the housing. The regulator housing is adapted to be attached to the fixed panes of the window assembly outboard of the sliding panes or to some other stationary structure of the vehicle surrounding the window opening.

According to yet another aspect of the invention, the engagement between the linear actuators and their respective sliding panes permits a degree of relative motion therebetween in a plane perpendicular to the direction of motion of the sliding panes. This allows the regulator to operate properly, without binding or jamming, when attached to a window assembly that is not perfectly flat along the line of sliding movement. It also simplifies the assembly process, since the regulator does not have to be attached to the window assembly with a great deal of precision.

BRIEF DESCRIPTION OF THE DRAWING

FIG. 1 is a perspective view of a vehicle having a sliding window assembly operated by a power regulator according to the present invention;

FIG. 2 is a front view of a window regulator according to the present invention;

FIG. 3 is a cross-sectional view taken along line 3—3 of FIG. 2;

FIG. 4 is a cross-sectional view taken along line 4—4 of FIG. 2;

FIG. 5 is a detail view of a carrier block and an attachment block according to the present invention; and FIG. 6 is a perspective view of an alternative version of a linear actuator assembly.

DETAILED DESCRIPTION OF THE PREFERRED EMBODIMENT

Referring to FIG. 1, a truck cab 10 is fitted with a window assembly 12 including first and second fixed panes 14,16 located at opposite ends of a window opening, and first and second sliding panes 18,20 mounted in guide tracks 22 extending across the top and bottom of the window opening.

A window regulator 24 according to the present invention is attached to the window assembly 12 adjacent the lower edge thereof on the interior of the truck cab 10. The window regulator 24 comprises an elongated housing 26 which is preferably secured at its outboard ends directly to the inner surface of the fixed panes 14,16 by, for example, an adhesive. As an alternative, the housing 26 may be attached to the cab structure surrounding the window opening below and/or outboard of the fixed panes 14,16. A drive unit 28 is attached to the housing 26 and comprises, as is well known in the window regulator art, a reversible electric motor 30 supplied with 12 volt DC electrical power from the vehicle electrical system. The motor 30 is controlled by a three-position switch (not shown) located within the truck cab 10 where it may be easily reached by occupants thereof.

Referring now to FIGS. 2–5, the regulator housing 26 comprises a center section 26a in the form of a generally C-shaped channel, and mounting extensions 26b,c projecting from the open side of the channel at either end. The housing 26 is preferably formed of aluminum or a high strength plastic. For convenience of description, the housing 26 will be referred to herein as having left and right ends as viewed in FIG. 2; assuming that the regulator 24 is mounted to the surface of the window assembly 12 on the inside of the truck cab 10, these terms will correspond to the left and right sides of the vehicle.

The drive unit 28 comprises a drive drum 32 enclosed within a casing 34 and which is driven in rotation by the motor 30. The drive unit 28 is attached to the approximate center of the housing 26, extending downwardly therefrom. The drive drum 32 has first and second parallel, spiral cable grooves 36,38 formed around the circumference thereof, as may best be seen in FIG. 4.

First and second pulleys 40,42 are mounted on axles at the extreme right and left ends of the regulator housing 26 and are partially enclosed by the mounting extensions 26b,c. A first pair of plastic guide blocks 44a,44b are secured to the interior of the housing 26 above a hole 46 formed in the lower flange of the housing 26 in approximate alignment with the left edge of the drum 32. A second pair of guide blocks 48a,48b are located at the junction between the drive unit 28 and the housing 26 in approximate alignment with the right edge of the drum 32. Guide blocks 48a,48b project through a gap 50 formed in the lower flange of the housing 26. All four of the guide blocks are quarter-circular in shape and have grooves 52 (see FIG. 4) formed in the curved guide surfaces thereof. The guide blocks are preferably made of a plastic having self-lubricating properties, such as TFPE.

A first linear actuator 54 is disposed in the left portion of the housing 26 and comprises a carrier block and a cable 58. As seen in FIGS. 3 and 5, the carrier block 56 has slots 56a,56b in the upper and lower edges thereof which engage ridges 64a,64b projecting from the upper and lower flanges of the housing 26, so that the carrier block 56 is retained to slide along the interior of the housing 26. The carrier block 56 also has a projection 56c which extends out past the flanges of the housing 26.

Beads 58a,58b terminate the ends of cable 58 and fit into holes 56d, 56e, respectively, formed in the carrier block. Cable 58 extends from the carrier block 56 toward the left end of the housing 26, wraps around the pulley 42 and back toward the center of the housing 26, passing in front of the lower portion of carrier block 56. Cable 58 then passes beneath guide blocks 44a,44b, around guide block 48a, engaging the groove therein, and downwardly through the gap 50 in the lower flange of housing 26. Cable 58 engages drum 32 by wrapping in a clockwise direction around the drum 32, fitting into the first of the spiral grooves 36. Typically, cable 58 will make more than one complete turn around drum 32 to provide a secure frictional engagement. Cable 58 then extends upwardly from the left side of drum 32, through the hole 46 in the lower flange of the housing 26, passes around guide block 44a and bead 58b at the end of the cable is received by hole 56e. Stop blocks 72 are secured to the interior of the housing 26 between pulley 42 and guide block 44a to limit movement of the carrier block 56 along the length of the housing 26.

A second linear actuator 74 is disposed in the right portion of the housing 26 and comprises a carrier block 76 and a cable 78 terminating in metal beads 78a,78b which engage holes 76d in the carrier block 76. Carrier block 76 has upper and lower slots 76a,76b (not visible in any of the views) which engage ridges 81 formed on the inside of the right end of the housing 26, and a projection 76c extending past the flanges of the housing.

Cable 78 extends from the carrier block 76 toward the right end of the housing 26, passing around the pulley 40, back toward the center of the housing, over the carrier block 76, around the guide block 48b and engages drum 32 by wrapping in a counterclockwise direction around the drum 32, fitting into the second spiral cable groove 38.

Typically, cable 78 will make more than one complete turn around drum 32 to provide a secure frictional engagement. Cable 78 then extends upwardly from the right side of drum 32, through the hole 50 in the lower flange of the housing 26, and passes around guide block 48b. Cable 78 then extends toward the right end of housing 26, passing in front of second carrier block 76, wraps around pulley 40, and bead 78a at the end of the cable is received by hole 76e. Stop blocks are secured to the interior of the housing 26 between pulley 40. And guide block 48b to limit movement of the carrier block 76 along the length of the housing 26.

As described hereinabove and seen in FIG. 2, when cable 58 is secured to the left carrier block 56 and wraps around drum 32, the cable and the left carrier block constitute a linear actuator in the form of a continuous loop connecting the left carrier block to the drum, with the left carrier block located at a midpoint of the linear actuator. Likewise, when cable 78 is secured to right carrier block 76 and wraps around drum 32, the cable and left carrier block constitute a second linear actuator in the form of a continuous loop connecting the right carrier block to the drum, with the right carrier block located at a midpoint of the linear actuator.

As best seen in FIG. 4, guide blocks 44a, 44b are mounted close to the rear or vertical wall of the housing 26 while guide blocks 48a, 48b are closer to the front or open closer to the front or open side of the housing 26. This allows the portion of cable 58 extending between the pulley and guide block 48a to pass in front of the portions of cables 58 and 78 extending from guide blocks 44a and 44b downwardly to the drum 32, thus avoiding any interference between the cables.

As seen in FIG. 6, a linear actuator 84 may alternatively be formed as a carrier block 88 with a midpoint of a single length of cable 86 bolted or otherwise attached to the carrier block.

As is apparent from FIG. 2, rotation of the drive drum 32 in the clockwise direction winds cables 58 and 78 around the drum 32, thereby pulling the carrier blocks 56,76 away from each other, toward the ends of the housing 26. Conversely, rotation of the cable drum 32 in a counterclockwise direction winds cables 58 and 78 around the drum 32, thereby pulling the carrier blocks 56,76 toward one another and toward the center of the housing 26.

Referring now to FIGS. 1 and 3, an attachment block 90 is bonded to the interior surface of each of the sliding panes 18,20 adjacent their lower edges. Each attachment block 90 has a flat front surface 90a and a pair of engagement tabs 90b extending perpendicularly therefrom. Except for the addition of the attachment blocks 90, a manually operated window assembly 12 requires no modification in order to adapt it to accept the regulator 24.

To attach the window regulator 24 to the window assembly 12, the sliding panes 18,20 are slid along their guide tracks 22 to locate the attachment blocks 90 at positions matching the positions of the carrier blocks 56,76. A glass adhesive is applied to the end surfaces of the mounting extensions 26b,c and/or to corresponding locations on the fixed panes 14,16 outboard of the guide tracks 22, and the mounting extensions are urged into contact with the window assembly 12 such that the projections 56c,76c of the carrier blocks fit between the engagement tabs 90b of their respective attachment blocks 90 on the sliding panes 18,20. The dimensions of the various components are such that, as best seen in FIG. 3, there is a small amount of clearance between the front surface 90a of the attachment block 90 and the confronting surface of the carrier block protrusion. The engagement tabs 90b are spaced from one another by a distance slightly greater than the overall width of the projections 56c,76c of the respective carrier blocks, so that the projections may slide easily between the engagement tabs.

The only contact between the carrier blocks 56,76 and attachment blocks 90 is where the inward-facing surfaces of the engagement tabs 90b contact the outboard ends of the carrier blocks 56,76. Consequently, relative motion between the carrier blocks 56,76 and attachment blocks 90 is permitted both vertically and fore-and-aft (relative to the vehicle) in the plane perpendicular to the direction of movement of the sliding panes 18,20. This relative motion allows for a significant degree of unevenness along the lower edge of the window assembly 12. The invention window regulator may therefore be used with window assemblies in which manufacturing tolerances are not precisely controlled.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A sliding window assembly for a vehicle comprising:
    first and second sliding window panes slidable in opposing directions toward one another to a closed position and away from one another to an open position;
    a rotatable drive drum;
    means for rotating the drive drum;
    a first linear actuator forming a loop and frictionally engaging the drive drum and having a midpoint engaged with the first pane;
    a second linear actuator forming a loop and fractionally engaging the drive drum and having a midpoint engaged with the second pane, whereby rotation of the drive drum in a first direction pulls on the first and second linear actuators to urge the first and second sliding panes toward one another and rotation of the drive drum in an opposite second direction pulls on the first and second linear actuators to urge the first and second panes away from one another.

2. The regulator mechanism of claim 1 wherein the first linear actuator comprises a first flexible, inextensible drive member engaged with the drum and a first carrier block attached thereto at the first midpoint, and the second linear actuator comprises a second flexible, inextensible drive member engaged with the drum and a second carrier block attached thereto at the second midpoint.

3. The sliding window assembly of claim 2 wherein the drum has first and second parallel spiral grooves formed in a circumferential surface thereof for engagement by the first and second drive members respectively.

4. The regulator mechanism of claim 2 wherein the first and second drive members comprise cables.

5. The sliding window assembly of claim 1 wherein the first and second linear actuators are enclosed in a housing having guide means attached thereto for routing the linear actuators along respective paths.

6. The sliding window assembly of claim 5 wherein the housing has first and second mounting means disposed at opposite ends thereof for connection to fixed portions of the window assembly.

7. The sliding window assembly of claim 5 wherein the guide means comprises at least one pulley.

8. The sliding window assembly of claim 5 wherein the guide means comprises at least one guide block.

9. A sliding window assembly having a sliding pane, a pane attachment element secured to the pane, and a window regulator comprising a drive drum, a flexible, inextensible drive member frictionally engaging the drive drum, and a pane carrier element secured to the drive member, the pane carrier element and the pane attachment element engaging one another to transfer motion of the drive member to the sliding pane to move the sliding pane between an open and a closed position, the window assembly characterized in that:
    the carrier element and the pane attachment element contact one another only in a plane perpendicular to the direction of sliding movement of the sliding pane.

\* \* \* \* \*